Figure 1:
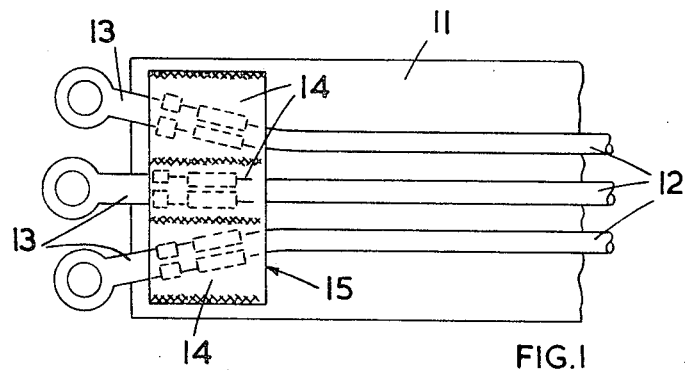

United States Patent
Fry

[11] 3,900,241
[45] Aug. 19, 1975

[54] WIRING HARNESS

[75] Inventor: William Lawrence Fry, Stafford, England

[73] Assignee: Rist's Wires & Cables Limited, Birmingham, England

[22] Filed: Jan. 31, 1974

[21] Appl. No.: 438,279

[30] Foreign Application Priority Data
Feb. 14, 1973   United Kingdom............... 7171/73

[52] U.S. Cl......... 339/59 M; 174/72 A; 339/113 B; 339/218 M
[51] Int. Cl.² ........................................ H01R 11/04
[58] Field of Search ..... 339/59 R, 59 M, 19, 113 B, 339/218 M, 276 SF, DIG. 1; 174/72 A

[56] References Cited
UNITED STATES PATENTS

| | | | |
|---|---|---|---|
| 3,074,043 | 1/1963 | Stearns et al. ............... | 174/72 A X |
| 3,129,814 | 4/1964 | Cheh et al. ............ | 339/276 SF UX |
| 3,339,719 | 9/1967 | Bush ...................... | 339/276 SF UX |
| 3,362,005 | 1/1968 | Corns.................................. | 339/19 |
| 3,519,978 | 7/1970 | Taormina........................ | 339/59 M |
| 3,566,004 | 2/1971 | Creedon...................... | 339/113 B X |
| 3,733,428 | 5/1973 | Fry................................... | 174/72 A |
| 3,819,848 | 6/1974 | Fry................................... | 174/72 A |

*Primary Examiner*—Joseph H. McGlynn
*Assistant Examiner*—Howard N. Goldberg
*Attorney, Agent, or Firm*—Holman & Stern

[57] ABSTRACT

A wiring harness particularly, but not exclusively for use in a vehicle electrical system, the harness including a thermoplastic backing strip. A conductive lead including a conductive core in a thermoplastic sheath is secured to the backing strip by having its sheath fused to the backing strip, and one end of the lead carries an electrical terminal. Positioned over the terminal is a thermoplastic cover, the cover being fused to the backing strip so as to locate the terminal in a predetermined position on the backing strip.

5 Claims, 4 Drawing Figures

3,900,241

WIRING HARNESS

This invention relates to a wiring harness particularly but not exclusively for use in a vehicle electrical system.

A wiring harness according to the invention includes a thermoplastic backing strip, at least one conductive lead including a conductive core within a thermoplastic sheath, said sheath being fused to the backing strip to secure the lead to the backing strip, a terminal electrically connected to one end of the core of the lead, and a thermoplastic cover engaged with said terminal and fused to said backing strip to locate the terminal in a predetermined position on the backing strip.

Conveniently the thermoplastic cover is a sleeve receiving said terminal.

Alternatively said cover is a patch of thermoplastic material overlying the terminal and fused to the backing strip on opposite sides of the terminal.

Preferably where the harness includes a plurality of leads with associated terminals, and the terminal covers are in the form of thermoplastic patches, then the patches are integral parts of a common thermoplastic sheet.

Desirably where the harness includes a plurality of leads and associated terminals then indicia identifying the terminals are embossed on the backing strip adjacent the terminals.

The invention further resides in a method of manufacturing a wiring harness comprising positioning at least one conductive lead, having a conductive core within a termoplastic sheath, on a platform, the core of the lead having connected thereto at one end a terminal which is engaged by a thermoplastic cover, and engaging with the lead and the cover a thermoplastic backing strip while heating the mutually presented surfaces of backing strip and the lead and said cover so that the backing strip fuses to the sheath of the lead and the cover.

Preferably where said cover is in the form of a patch of thermoplastic material, the patch is positioned on the platform beneath the terminal prior to engagement of the backing strip with the lead, and the backing strip engages and is fused to the patch on opposite sides of the terminal.

Figure 2:
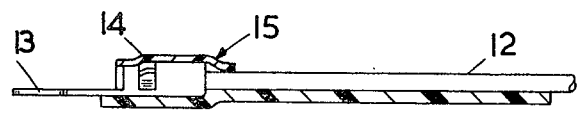
Figure 3:
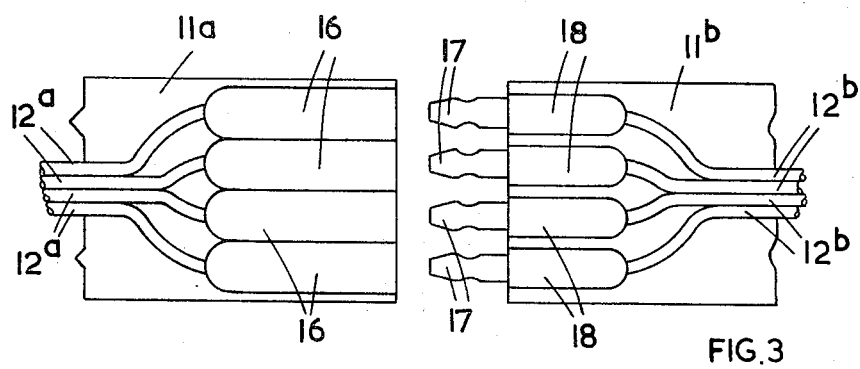
Figure 4:
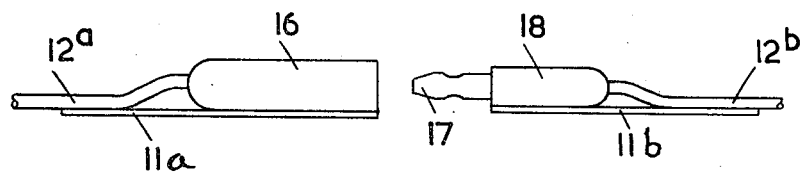

In the accompanying drawings:

FIG. 1 is a plan view of a wiring harness in accordance with one example of the invention, FIG. 2 is a sectional view of the harness shown in FIG. 1, FIG. 3 is a plan view of a harness in accordance with a second example of the invention, and FIG. 4 is a side elevational view of the harness shown in FIG. 3.

Referring first to FIGS. 1 and 2 of the drawings the wiring harness includes a flexible backing strip 11 formed from thermoplastic material, conveniently polyvinylchloride. The harness further includes a plurality of electrical leads 12 each of which consists of a conductive core within an insulating sheath of thermoplastic material, again conveniently polyvinylchloride. The leads 12 are secured in position relative to one another, and to the backing strip 11 by having their sheaths fused to the backing strip 11 conveniently along substantially the whole of their length. At at least one end each of the leads 12 has secured thereto a terminal 13, each terminal 13 being electrically and physically connected to its respective lead 12. Conveniently, the terminals 13 will be adjacent a free end of the backing strip 11 although it is to be appreciated that this is not essential. In order to secure the terminal members 13 in a desired position relative to one another and relative to the backing strip 11 each terminal member 13 has associated therewith a patch 14 of thermoplastic material, again conveniently polyvinylchloride. Each patch 14 overlies part of its respective terminal member 13 and is fused to the backing strip 11 on opposite sides of its respective terminal member 13 so as to trap the terminal member 13 in position. Where the terminal members 13 are adjacent one another then the patches 14 associated with each terminal member 13 can be integral parts of a common thermoplastic strip 15.

In the example shown in FIGS. 3 and 4 two harnesses to be electrically interconnected are shown. The harnesses again include a backing strip 11a, 11b formed from thermoplastic material and leads 12a, 12b each comprising a conductive core within a thermoplastic sheath. The thermoplastic sheaths of the leads 12a, and 12b are secured to their backing strips 11a, 11b by fusing the sheaths to the backing strips conveniently along substantially the whole of their length to secure the leads to the backing strip. The leads 12a of the first harness terminate in cylindrical socket terminals which are encased in respective thermoplastic sleeves 16. The socket terminals of the leads 12a are secured in position relative to one another and relative to the backing strip 11a by fusion of the sheaths 16 to the backing strip 11a. The leads 12b of the associated harness terminate in cylindrical pin terminals 17 shaped to mate with the socket terminals of the leads 12a. The pin terminals 17 are encased along part of their length adjacent their respective leads 12b, in respective thermoplastic sleeves 18, but of course project from the sleeves 18 to permit insertion into the socket terminals of the leads 12a. The pin terminals 17 are secured in position relative to one another and relative to the backing strip 11b by fusion of their sheaths 18 to the backing strip 11b.

It is to be appreciated that while in the arrangement shown in FIG. 1 and 2 thermoplastic patches overlying the terminals are utilized, it is equally possible that the terminals 13 could be encased along part of their length by thermoplastic sleeves fused to the backing strip 11. Similarly, in the arrangement shown in FIGS. 3 and 4 the socket terminals of the leads 12a and the pin terminals 17 could be secured in position by thermoplastic patches fused to the backing strip 11 in perference to the use of the thermoplastic sleeves 16, 18.

In either of the examples described above indicia identifying the terminals can be embossed on the backing strip adjacent the terminals.

The method in which either of the examples shown is manufactured is as follows:

The leads of the harness are laid in predetermined positions on a platform and the backing strip is then dispensed from a reel onto the leads, along their length. The backing strip is simultaneously fused to the sheaths of the leads by the application of heat to the mutually presented surfaces of the backing strip and the sheaths of the lead as the backing strip is laid onto the leads. The terminals associated with the leads are secured to the leads before the leads are laid on the platform, and in the example where the terminals have associated thermoplastic sleeves then the sleeves are in position prior to positioning the leads on the platform. Similarly, where the cover members of the terminals are in the form of thermoplastic patches then the patches, or the sheet which defines the patches is laid in position on the platform beneath the leads prior to the application of the backing strip. Thus, as the backing strip is laid onto the leads, and the mutually presented surfaces of the backing strip is laid adjacent the terminals of the leads then the thermoplastic sleeves of the terminals, or the patches associated with the terminals will also be heated, and will be fused to the backing strip in the same operation.

Apparatus for producing wiring harnesses wherein a backing strip is fused to the sheaths of the leads of the harness is described in co-pending U.S. Pat. application No. 387.636.

What is claimed is:

1. A wiring harness including a thermoplastic backing strip, at least one conductive lead including a conductive core in a thermoplastic sheath, said sheath being fused to the backing strip to secure the lead to the backing strip, a terminal electrically connected to one end of the core of the lead, and a thermoplastic sleeve within which said terminal is received, said sleeve being fused to said backing strip to locate the terminal in a predetermined position on said backing strip.

2. A wiring harness as claimed in claim 1 wherein the backing strip is embossed with indicia identifying the or each terminal member.

3. A wiring harness as claimed in claim 1 including a plurality of further conductive leads each including a conductive core in a thermoplastic sheath, each of said sheaths being fused to the backing strip to secure the lead in position on the backing strip, and each lead having a terminal electrically connected to one end of its conductive core and a respective thermoplastic sleeve receiving each of said terminals, each of said thermoplastic sleeves being fused to said backing strip to locate the respective terminal in a predetermined position on the backing strip.

4. A method of manufacturing a wiring harness comprising, positioning at least one conductive lead, having a conductive core within a thermoplastic sheath, on a platform, the core of the lead having connected thereto at one end a terminal which is received in a thermoplastic sleeve, and, engaging with the lead and the sleeve a thermoplastic backing strip while heating the mutually presented surfaces of the backing strip and the lead and said sleeve so that the backing strip fuses to the sheath of the lead and to the sleeve.

5. A method as claimed in claim 4 wherein a plurality of conductive leads each having a conductive core within a thermoplastic sheath are positioned on said platform, the core of each lead having connected thereto at one end a terminal which is received in a thermoplastic sleeve, said thermoplastic backing strip being engaged with the leads and the sleeves while heating the mutually presented surfaces of the backing strip and the leads and said sleeves so that the backing strip fuses to the sheaths of the leads and to said sleeves.

* * * * *